US012643324B2

(12) United States Patent
Sugiura

(10) Patent No.: US 12,643,324 B2
(45) Date of Patent: Jun. 2, 2026

(54) LIQUID EJECTING HEAD

(71) Applicant: BROTHER KOGYO KABUSHIKI KAISHA, Nagoya (JP)

(72) Inventor: Keita Sugiura, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 142 days.

(21) Appl. No.: 18/624,242

(22) Filed: Apr. 2, 2024

(65) Prior Publication Data

US 2024/0326427 A1 Oct. 3, 2024

(30) Foreign Application Priority Data

Apr. 3, 2023 (JP) ................................. 2023-059731

(51) Int. Cl.

| | |
|---|---|
| ***B41J 2/14*** | (2006.01) |
| ***B41J 2/175*** | (2006.01) |
| ***B41J 2/18*** | (2006.01) |

(52) U.S. Cl.

CPC ....... *B41J 2/14233* (2013.01); *B41J 2/17563* (2013.01); *B41J 2/18* (2013.01); *B41J 2002/14306* (2013.01); *B41J 2002/14419* (2013.01); *B41J 2002/14459* (2013.01); *B41J 2202/11* (2013.01); *B41J 2202/12* (2013.01)

(58) Field of Classification Search

CPC ...... B41J 2/14233; B41J 2/17563; B41J 2/18; B41J 2002/14306; B41J 2002/14419; B41J 2002/14459; B41J 2202/11; B41J 2202/12; B41J 2002/14403

See application file for complete search history.

(56) References Cited

U.S. PATENT DOCUMENTS

| | | | | |
|---|---|---|---|---|
| 2016/0288499 | A1 | 10/2016 | Sugahara et al. | |
| 2020/0384759 | A1 | 12/2020 | Sugiura et al. | |
| 2021/0300037 | A1 | 9/2021 | Ishizaki et al. | |
| 2024/0326435 | A1 * | 10/2024 | Sugiura | B41J 2/14233 |

FOREIGN PATENT DOCUMENTS

| | | | |
|---|---|---|---|
| JP | 2016190431 | A | 11/2016 |
| JP | 2020196234 | A | 12/2020 |
| JP | 2021160345 | A | 10/2021 |

* cited by examiner

*Primary Examiner* — Justin Seo

(74) *Attorney, Agent, or Firm* — Element IP, PLC

(57) ABSTRACT

A liquid ejecting head includes: a channel member having channel groups, and actuators. Each of the channel groups has: nozzles, a supply channel, a return channel, and a connecting channel connecting one end in a first direction of the supply channel and one end in the first direction of the return channel. The channel member has a supply port communicating with the other end in the first direction of the supply channel, and a discharge port communicating with the other end in the first direction of the return channel. In two channel groups adjacent in a third direction, a set of the supply and discharge ports communicating with one of the two channel groups and a set of the supply and discharge ports communicating with the other of the two channel groups are arranged to be opposite to each other in the first direction.

22 Claims, 8 Drawing Sheets

LIQUID EJECTING HEAD

REFERENCE TO RELATED APPLICATIONS

This application claims priority from Japanese Patent Application No. 2023-059731 filed on Apr. 3, 2023. The entire content of the priority application is incorporated herein by reference.

BACKGROUND ART

Conventionally, there is a known ink-jet head (hereinafter referred to as a "first ink-jet head") provided with a channel member having a plurality of channel groups and a piezoelectric actuator arranged on the channel member. In the first ink-jet head, each of the plurality of channel groups has a plurality of nozzles aligned along a first direction, a first manifold (supply channel) extending in the first direction and communicating with the plurality of nozzles, a second manifold (return channel) extending in the first direction, communicating with the plurality of nozzles and arranged side by side with the first manifold in a second direction orthogonal to the first direction, and a connecting channel connecting one end part in the first direction of the first manifold and one end part in the first direction of the second manifold. The channel groups are arranged side by side in the second direction. The piezoelectric actuator has a plurality of active parts (actuators). Each of the plurality of active parts applies energy to ink in the channel member so as to eject the ink from one of the plurality of nozzles. The channel member further has an ink supply port communicating with the other end part in the first direction of the first manifold and an ink discharge port communicating with the other end part in the first direction of the second manifold.

In the above-described first ink-jet head, the ink supplied from the ink supply port flows in (through) the first manifold from the side of the other end part toward the side of the one end part in the first direction. Afterwards, the ink flows into the second manifold, via the connecting channel, and flows in the second manifold from the side of the one end part toward the other end part in the first direction, and is discharged (exhausted) from the ink discharge port.

There is also another known ink-jet head (hereinafter referred to as a "second ink-jet head") provided with a channel member having a plurality of channel groups and a piezoelectric actuator arranged on the channel member. In the second ink-jet head, each of the plurality of channel groups has a plurality of individual channels aligned along a first direction, a supply channel extending in the first direction and communicating with the plurality of individual channels, and a return channel extending in the first direction, communicating with the plurality of individual channels and arranged side by side with the supply channel in a second direction orthogonal to the first direction. The plurality of channel groups is arranged side by side in a third direction orthogonal to the first and second directions. Each of the individual channels has a nozzle, a first communicating channel having one end communicating with the supply channel and the other end communicating with the nozzle, and a second communicating channel having one end communicating with the nozzle and the other end communicating with the return channel. The piezoelectric actuator has a plurality of active parts (actuators). Each of the plurality of active parts applies energy to ink in the channel member so as to eject the ink from the nozzle. The channel member further has an ink supply port communicating with the other end part in the first direction of the supply channel and an ink discharge port communicating with the other end part in the first direction of the return channel.

In the second ink-jet head, the ink supplied from the ink supply port flows in the supply channel from the side of the other end part toward one end part in the first direction. Afterwards, the ink flows into the return channel via the first communicating channel and the second communicating channel, flows in the return channel from the side of one end part toward the side of the other end part in the first direction, and is discharged from the ink discharge port.

SUMMARY

In the first ink-jet head, the temperature of the ink supplied from the ink supply port to the first manifold during printing is increased due to a heat transmitted from each of the actuators until the ink reaches the connecting channel. Further, during the printing, a flow amount of the ink in the first manifold is greater at a location closer to the ink supply port, whereas the flow amount of the ink in the first manifold is smaller at a location closer to the connecting channel. As the flow amount of the ink is smaller, a cooling effect of cooling the channel member and/or the actuator becomes smaller. Due to the increase in the temperature by the heat transferred from the actuator and the difficulty in obtaining the cooling effect due to the small flow amount, the temperature at the other end part in the first direction of the channel member (an end part on the side of the ink supply port) becomes lower than the temperature at the one end part in the first direction of the channel member (an end part on the side of the connecting channel). Due to this, the temperature of the ink inside the first manifold at the one end part thereof in the first direction is high, as compared with the temperature of the ink at the other end part in the first direction; and consequently, the viscosity of the ink inside the first manifold is low at the one end part in the first direction of the first manifold, as compared with the viscosity of the ink at the other end part in the first direction of the first manifold. This causes any variation in an ink ejecting property among the plurality of nozzles communicating with the first manifold.

Note that the temperature of the ink passing through the second manifold from the connecting channel and flowing toward the ink discharge port is also increased by the heat transferred from the actuator. During the printing, however, the amount of the ink passing through the second manifold is smaller than the amount of the ink passing through the first manifold, due to the above-described difference between the flow amounts. The temperature of the ink passing through the second manifold from the connecting channel and flowing toward the ink discharge port has been increased to some extent at a point of time at which the ink has passed through the first manifold. Due to this, the increase in the temperature in the ink passing through the second manifold and flowing toward the ink discharge port is small, as compared with the increase in the temperature in the ink passing the first manifold and flowing toward the connecting channel, and thus has little cooling effect. Accordingly, in the entirety of the channel member, the temperature in the other end part in the first direction becomes lower than the temperature in the one end part in the first direction.

Also in the above-described second ink-jet head, the temperature in the other end part in the first direction (the end part on the side of the ink supply port) of the channel member becomes lower than the temperature in the one end part in the first direction (the end part on the side opposite to the ink supply port) of the channel member, due to the increase in the temperature by the heat transferred from the actuator and the difficulty in obtaining the cooling effect due to the small flow amount, in a similar manner in the above-described first ink-jet head. Due to this, the temperature of the ink inside the supply channel at the one end part in the first direction of the supply channel is high, as compared with the temperature of the ink at the other end part in the first direction of the supply channel; and consequently, the viscosity of the ink at the one end part in the first direction of the supply channel is low, as compared with the viscosity of the ink at the other end part in the first direction of the supply channel. This causes any variation in an ink ejecting property among the plurality of nozzles communicating with the supply channel.

Note that also in the return channel, the temperature of the ink passing through the return channel and flowing toward the ink discharge port has been increased to some extent at a point of time at which the ink has passed through the supply channel, in a similar manner in the above-described first ink-jet head. Due to this, the increase in the temperature in the ink passing through the return channel and flowing toward the ink discharge port is small, as compared with the increase in the temperature in the ink passing through the supply channel and flowing from the side of the other end part to the side of the one end part of the channel member, and thus has little cooling effect. Accordingly, in the entirety of the channel member, the temperature in the other end part in the first direction becomes lower than the temperature in the one end part in the first direction.

In view of the above-described situations, an object of the present disclosure is to provide a liquid ejecting head capable of making the difference in the temperature in the first direction in the channel member be small.

According to a first aspect of the present disclosure, there is provided a liquid ejecting head, including: a channel member having a plurality of channel groups; and a plurality of actuators arranged on the channel member. Each of the channel groups has: a plurality of nozzles aligned along a first direction; a supply cannel extending in the first direction and communicating with the nozzles; a return channel extending in the first direction, communicating with the nozzles, and arranged side by side with the supply channel in a second direction crossing the first direction; and a connecting channel connecting one end in the first direction of the supply channel and one end in the first direction of the return channel. The channel groups are aligned in a third direction crossing the first direction. Each of the actuators is configured to apply energy to liquid in the channel member to cause the liquid to be ejected from one of the nozzles, the actuators being arranged along the first direction to correspond to the nozzles. The channel member further has a supply port communicating with the other end in the first direction of the supply channel, and a discharge port communicating with the other end in the first direction of the return channel. In two channel groups, which are included in the channel groups and which are adjacent in the third direction, a set of the supply port and the discharge port communicating with one of the two channel groups and a set of the supply port and the discharge port communicating with the other of the two channel groups are arranged to be opposite to each other in the first direction.

According to a second aspect of the present disclosure, there is provided a liquid ejecting head, including: a channel member having a plurality of channel groups; and a plurality of actuators arranged on the channel member. Each of the channel groups has: a plurality of individual channels aligned along a first direction; a supply cannel extending in the first direction and communicating with the individual channels; and a return channel extending in the first direction, communicating with the individual channels, and arranged side by side with the supply channel in a second direction crossing the first direction. The channel groups are aligned in a third direction crossing the first direction. The individual channels have nozzles, first communicating channels having one ends communicating with the supply channel and the other ends communicating with the nozzles, and second communicating channels having one ends communicating with the nozzles and the other ends communicating with the return channel. Each of the actuators is configured to apply energy to liquid in the channel member to cause the liquid to be ejected from one of the nozzles, the actuators being arranged along the first direction to correspond to the nozzles. The channel member further has a supply port communicating with one end in the first direction of the supply channel, and a discharge port communicating with one end in the first direction of the return channel. In two channel groups, which are included in the channel groups and which are adjacent in the third direction, a set of the supply port and the discharge port communicating with one of the two channel groups and a set of the supply port and the discharge port communicating with the other of the two channel groups are arranged to be opposite to each other in the first direction.

According to the liquid ejecting head according to the aspects of the present disclosure, in the two adjacent channel groups which are adjacent in the third direction, the set of the supply port and the discharge port communicating with one of the two adjacent channel groups is arranged at the side of the one end part in the first direction of the channel member, and the set of the supply port and the discharge port communicating with the other of the two adjacent channel groups is arranged at the side of the other end part in the first direction of the channel member. Owing to this, the tendencies in the increase in the temperature by the heat transferred from the actuator and in the difference in the flow amount in the first direction become opposite between the two adjacent channel groups. As a result, it is possible to make the temperature difference of the liquid in the first direction small in the entirety of the channel member.

DESCRIPTION

First Embodiment

Figure 1:
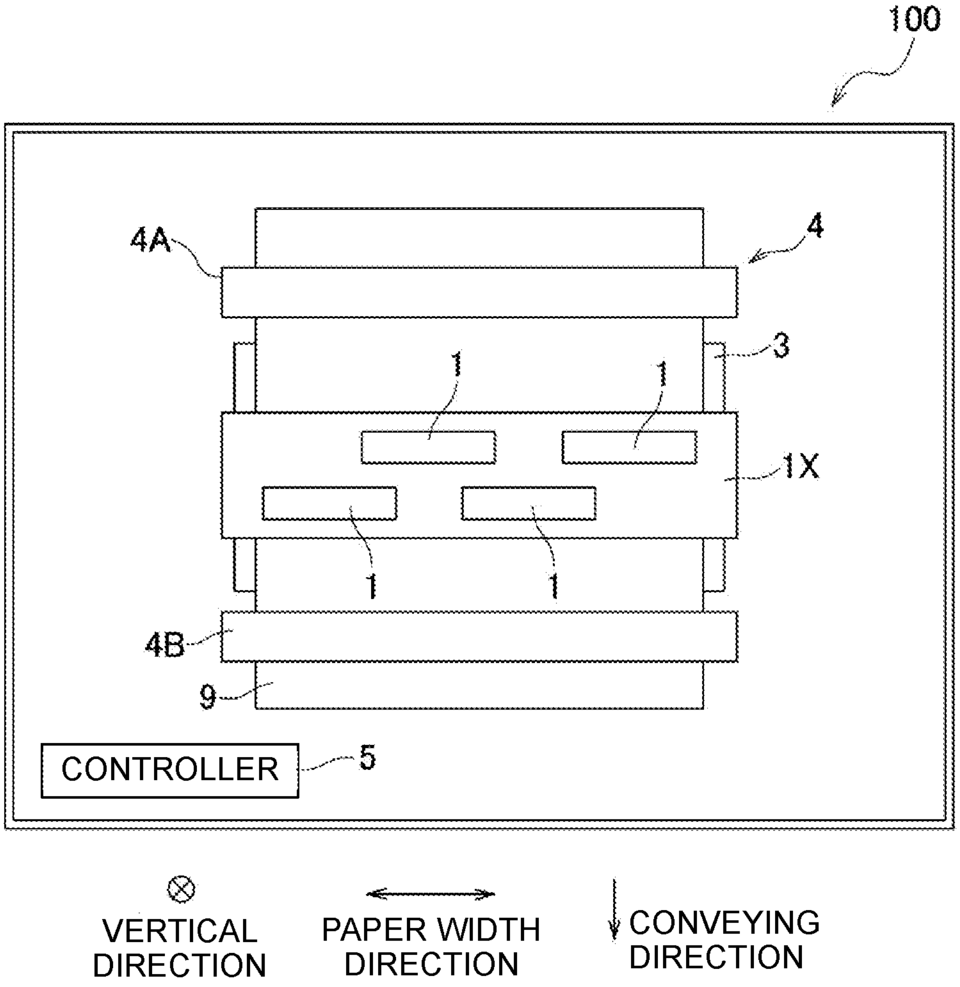
FIG. 1 is a plan view depicting a printer provided with a head according to an embodiment of the present disclosure.

First, an explanation will be given about the entire configuration of a printer 100 provided with a head 1 according to a first embodiment of the present disclosure, with reference to FIG. 1.

The printer 100 is provided with: a head unit 1X including four heads 1; a platen 3; a conveying mechanism 4; and a controller 5. A paper sheet 9 is placed on the upper surface of the platen 3.

The conveying mechanism 4 has two roller pairs 4A and 4B which are arranged while sandwiching the platen 3 therebetween in a conveying direction. In a case that a conveying motor (not depicted in the drawings) is driven by a control of the controller 5, the roller pairs 4A and 4B rotate in a state that the roller pairs 4A and 4B nip (pinch) the paper sheet 9 therebetween. With this, the paper sheet 9 is conveyed in the conveying direction.

The head unit 1*x* is long in a paper width direction (a "first direction" of the present disclosure: a direction orthogonal to both of the conveying direction and a vertical direction) and is a line system in which ink is ejected from a nozzle 21 (see FIGS. 2 and 3) with respect to the paper sheet 9 in a state that a position of the head unit 1*x* is fixed. Each of the four heads 1 is long in the paper width direction, and the four heads 1 are arranged in a staggered manner in the paper width direction.

The controller 5 includes a ROM, a RAM and an ASIC. The ASIC executes a recording processing, etc., based on a program stored in the ROM. In the recording processing, the controller 5 controls a driver IC of each of the heads 1 and a conveying motor (both of which are not depicted in the drawings) based on a recording instruction (including image data) inputted from an external apparatus such as a personal computer, etc., thereby recording an image on the paper sheet 9.

Figure 2:
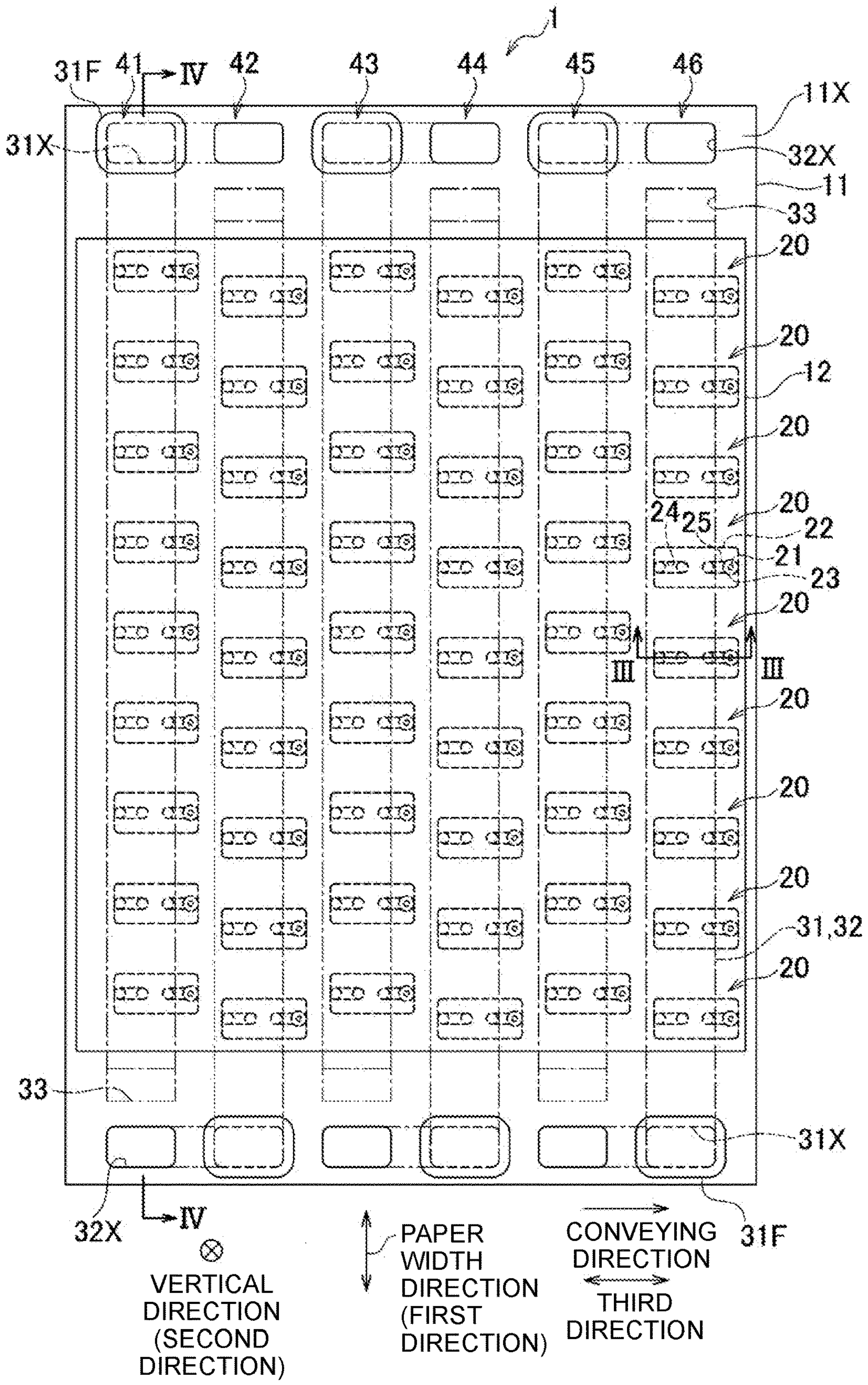
FIG. 2 is a plan view of the head depicted in FIG. 1.
Figure 3:
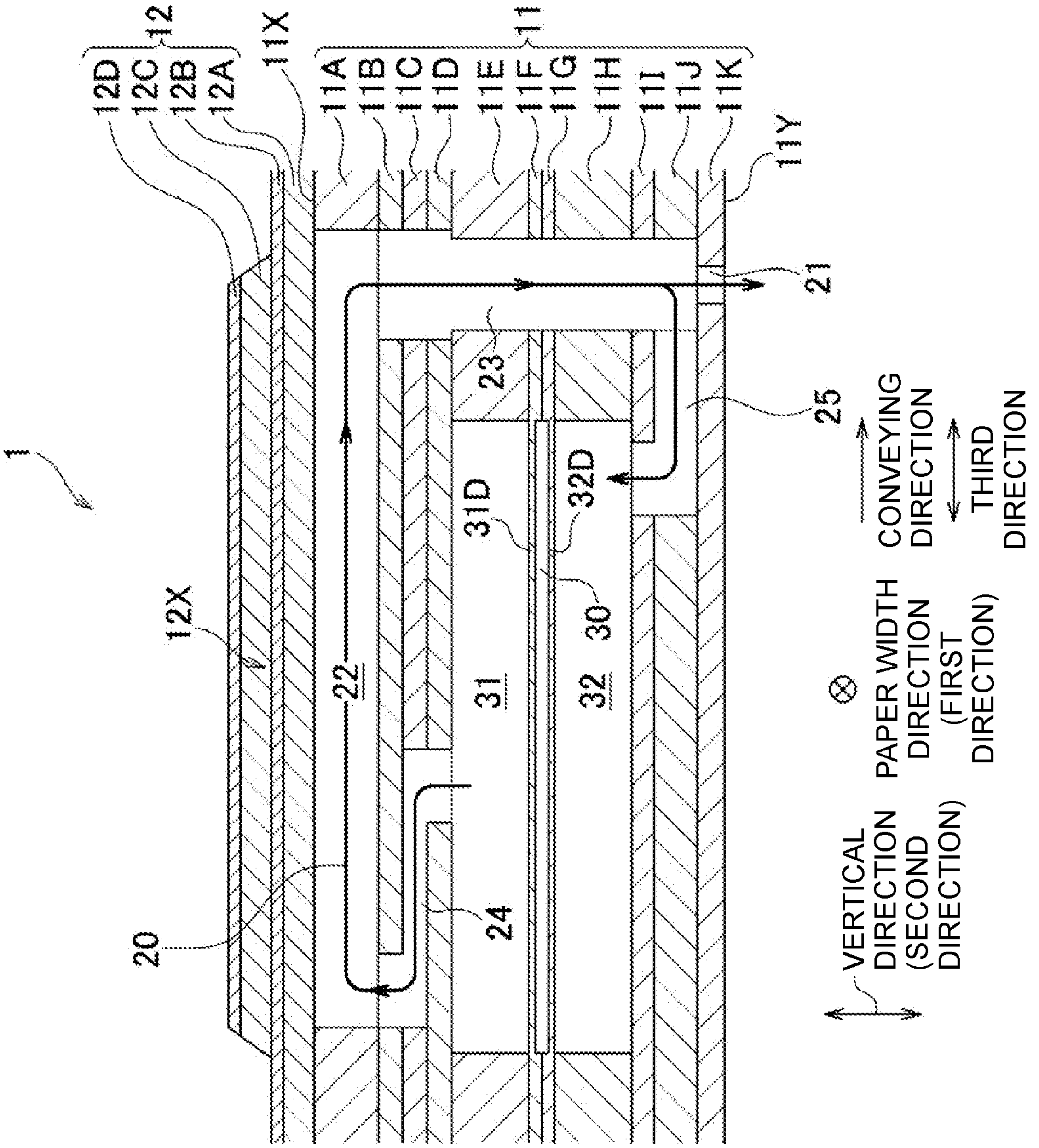
FIG. 3 is a cross-sectional view of the head, taken along a III-III line of FIG. 2.
Figure 4:
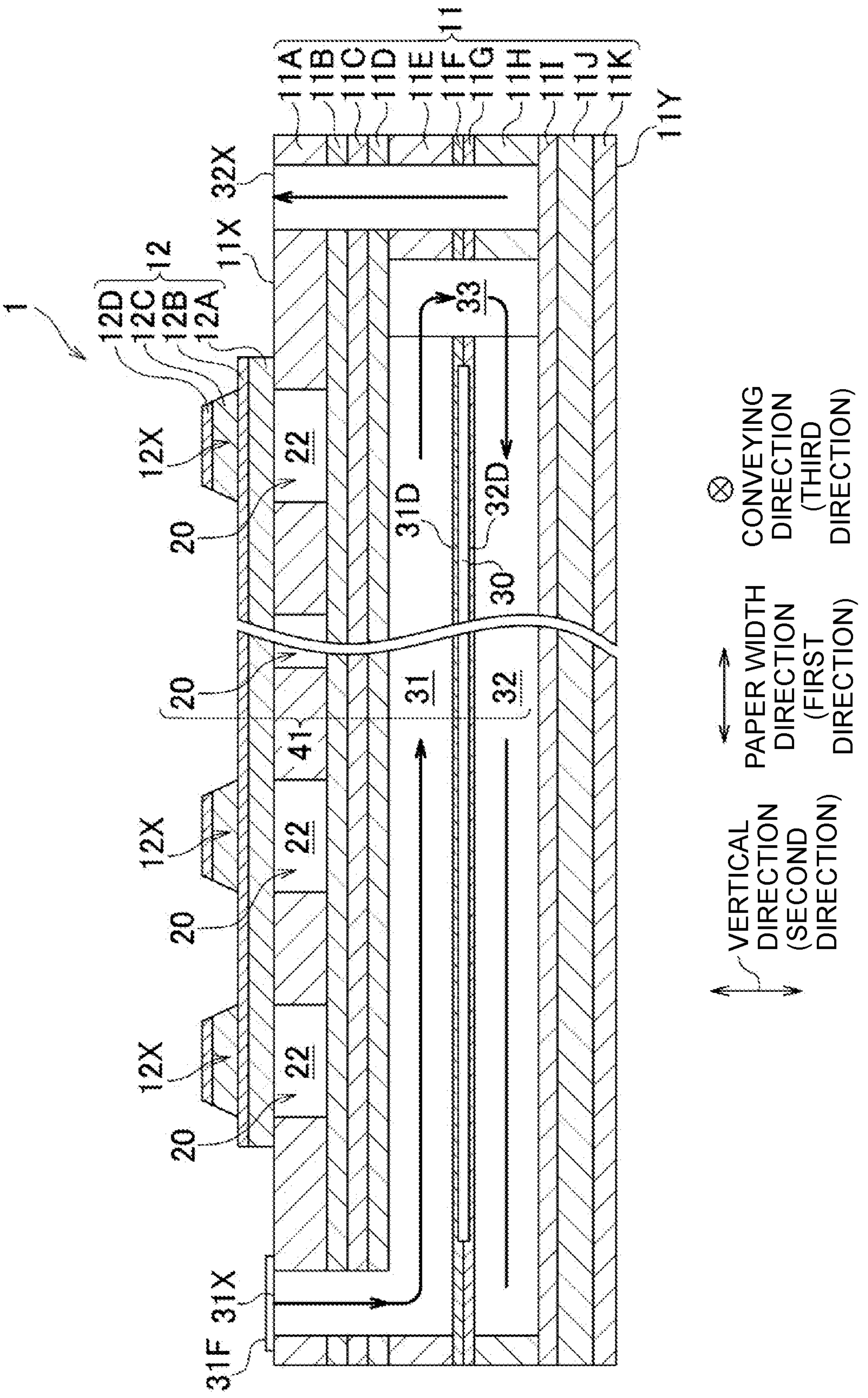
FIG. 4 is a cross-sectional view of the head, taken along a IV-IV line of FIG. 2.

Next, an explanation will be given about the configuration of each of the heads 1, with reference to FIGS. 2 to 4. As depicted in FIGS. 2 to 4, each of the heads 1 has a channel member 11 and an actuator member 12.

The channel member 11 is constructed of eleven plates 11A to 11K which are stacked in the vertical direction and adhered to one another, as depicted in FIGS. 3 and 4. A through hole constructing a channel is formed in each of the plates 11A to 11K. The channel includes a plurality of individual channels 20, a supply channel 31, a return channel 32 and a connecting channel 33.

As depicted in FIG. 2, the channel member 11 is provided with the plurality of individual channels 20 arranged (aligned) in a row in the paper width direction, and six channel groups 41 to 46 each of which is constructed of the supply channel 31, the return channel 32 and the connecting channel 33 communicating with the plurality of individual channels 20.

In each of the channel groups 41 to 46, the supply channel 31 and the return channel 32 are arranged side by side in the vertical direction (a "second direction" of the present disclosure; a height direction of each of the supply channel 31 and the return channel 32, and a direction crossing the first direction), and overlap with each other in the vertical direction, as depicted in FIGS. 3 and 4.

The six channel groups 41 to 46 are arranged side by side in a direction parallel to the conveying direction (a "third direction" of the present disclosure; a width direction of each of the supply channel 31 and the return channel 32, and is a direction orthogonal to both of the first direction and the second direction), at equal spacing distances therebetween.

Each of the supply channel 31 and the return channel 32 extends in the first direction. The supply channel 31 and the return channel 32 are substantially the same in the length (length in the first direction) thereof, the width (length in the third direction) thereof and the height (length in the second direction) thereof.

In each of the channel groups 41 to 46, the connecting channel 33 extends in the second direction and connects one end in the first direction of the supply channel 31 and one end in the first direction of the return channel 32, as depicted in FIG. 4.

The supply channel 31 and the return channel 32 communicate, with a sub tank (not depicted in the drawings), respectively, via a supply port 31X and a discharge port 32X which communicate, respectively, with the other end in the first direction of the supply channel 31 and the other end in the first direction of the return channel 32. The supply port 31X and the discharge port 32X communicating, respectively, with the supply channel 31 and the return channel 32 of each of the channel groups 41 to 46 are opened in an upper surface (a "surface" of the present disclosure) 11X of the channel member 11.

Sets of the supply port 31X and the discharge port 32X, each of which communicates with one of three channel groups 41, 43 and 45, are located on a same side in the first direction (a side of an upper end of FIG. 2) with respect to the plurality of individual channels 20, and are arranged side by side in the third direction. Sets of the supply port 31X and the discharge port 32X, each of which communicates with one of three channel groups 42, 44 and 46, are located on a same side in the first direction (a side of a lower end of FIG. 2) with respect to the plurality of individual channels 20, and are arranged side by side in the third direction. For example, in two adjacent channel groups 41 and 42 which are adjacent in the third direction, a set of the supply port 31X and the discharge port 32X communicating with the channel group 41 and a set of the supply port 31X and the discharge port 32X communicating with the channel group 42 are arranged to be opposite to each other in the first direction. Further, sets of the supply port 31X and the discharge port 32X each of which belongs to one of the six channel groups 41 to 46 are arranged alternately along the third direction at both ends parts in the first direction of the channel member 11.

Furthermore, the supply port 31X and the discharge port 32X communicating with each of the six channel groups 41 to 46 are arranged side by side in the third direction. Moreover, for example in two channel groups 41 and 42 which are adjacent in the third direction, the supply port 31X communicating with the channel group 41 and the discharge port 32X communicating with the channel group 42 are arranged along the first direction. In other words, in the two adjacent channel groups 41 and 42 which are adjacent in the third direction, the discharge port 32X communicating with the channel group 41 and the supply port 31X communicating with the channel group 42 are arranged along the first direction.

Further, six filters 31F are provided on the upper surface 11X of the channel member 11. Each of the filters 31F covers one of the supply ports 31X. This makes it possible to catch or trap a foreign matter from the ink flowing into each of the supply ports 31X. In the present embodiment, although the filters 31F each covering one of the supply ports 31X are provided on the upper surface 11F of the channel member 11, a filter covering each of the discharge ports 32X is not provided. Namely, each of the discharge ports 32X is not covered by the filter. This makes resistance small in a case that the ink passes through each of the discharge ports 32X.

The sub tank communicates with a main tank configured to store the ink and stores the ink supplied from the main tank. The ink in the sub tank flows from the supply port 31X to the supply channel 31 by a driving of a pump (not depicted in the drawings) through the control of the controller 5. The ink flowing into the supply channel 31 is supplied to the respective individual channels 20 (see FIG. 3) while moving in the supply channel 31 from the other end in the first direction (the left end in FIG. 4) toward the one end in the first direction (the right end in FIG. 4) of the supply channel 31. The ink flowed out of the respective individual channels 20 flows into the return channel 32. Further, the ink which has reached the one end in the first direction (the right end in FIG. 4) of the supply channel 31 passes through the connecting channel 33 and flows into the return channel 32. The ink flowing into the return channel 32 moves in the return channel 32 from the one end in the first direction toward the other end in the first direction (the left end in FIG. 4) of the return channel 32, and is returned to the sub tank via the discharge port 32X.

As depicted in FIGS. 3 and 4, the supply channel 31 is constructed of a through hole formed in the plate 11E. The return channel 32 is constructed of a through hole formed in the plate 11H. A damper chamber 30 is provided between the supply channel 31 and the return channel 32 in the second direction. The damper chamber 30 is constructed of a recessed part formed in the plate 11F and a recessed part formed in the plate 11G. A bottom part of the recessed part in the plate 11F functions as a damper film 31D of the supply channel 31. A bottom part of the recessed part in the plate 11G functions as a damper film 32D of the return channel 32.

Each of the individual channels 20 includes a nozzle 21, a pressure chamber 22, a communication channel 23, an inflow channel 24 and an outflow channel 25, as depicted in FIG. 3.

The nozzle 21 is constructed of a through hole formed in the plate 11K, and the nozzle 21 is opened in a lower surface 11Y of the channel member 11. The pressure chamber 22 is constructed of a through hole formed in the plate 11A, and the pressure chamber 22 is opened in the upper surface 11X of the channel member 11. The pressure chamber 22 has a substantially rectangular planar shape which is long in the third direction. The inflow channel 24 is connected to one end in the third direction of the pressure chamber 22, and the communicating channel 23 is connected to the other end in the third direction of the pressure chamber 22.

The communicating channel 23 is constructed of through holes formed, respectively, in the plates 11B to 11J, and extends in the second direction. The communicating channel 23 is arranged between the nozzle 21 and the pressure chamber 22 in the second direction, and connects the nozzle 21 and the pressure chamber 22 with each other.

The inflow channel 24 is constructed of through holes formed, respectively, in the plate 11B to 11D. The inflow channel 24 has an upper end connecting to the pressure chamber 22 and a lower end connecting to the supply channel 31. The outflow channel 25 is constructed of through holes formed, respectively, in the plate 11I and 11J. The outflow channel 25 has one end connecting to the lower end of the communicating channel 23 and the other end connecting to the return channel 32. Each of the inflow channel 24 and the outflow channel 25 has a width (a length in the first direction) smaller than a width (a length in the first direction) of the pressure chamber 22, and functions as a throttle.

Here, the inflow channel 24, the pressure chamber 22 and the communicating channel 23 correspond to a "first communicating channel" of the present disclosure, and a part of the communicating channel 23 and the outflow channel 25 correspond to a "second communicating channel" of the present disclosure.

The ink supplied from the supply channel 31 to each of the individual channels 20 passes through the inflow channel 24 and flows into the pressure chamber 22, moves substantially horizontally in the pressure chamber 22, and flows into the communicating channel 23. The ink inflowed into the communicating channel 23 moves downward in the communicating channel 23; a part of the ink is ejected from the nozzle 21 and the remainder of the ink passes the outflow channel 25 and flows into return channel 32.

By circulating the ink between the sub tank and the channel member 11 in such a manner, discharge of air and/or prevention of any increase in the viscosity of the ink in the supply channel 31 and the return channel 32 formed in the channel member 11 as well as in each of the individual channels 20 formed in the channel member 11 are achieved. Further, in a case that the ink contains any sedimentary component (a component which might sediment, such as a pigment, etc.), such a sedimentary component is agitated, thereby preventing the sedimentation thereof.

As depicted in FIGS. 3 and 4, the actuator member 12 includes a vibration plate 12A, a common electrode 12B, a plurality of piezoelectric bodies 12C and a plurality of individual channels 12D, in this order from the lower side. The vibration plate 12A and the common electrode 12B are arranged on the upper surface 11X of the channel member 11, and cover all of the pressure chambers 22 formed in the plate 11A. On the other hand, each of the plurality of piezoelectric bodies 12C and each of the plurality of individual electrodes 12D are provided on one of the pressure chambers 22, and overlap with one of the pressure chambers 22 in the second direction.

The common electrode 12B and the plurality of individual electrodes 12D are electrically connected to a driver IC (not depicted in the drawings). The driver IC maintains the potential of the common electrode 12B at the ground potential, whereas the driver IC changes the potential of the plurality of individual electrodes 12D. Specifically, the driver IC generates a driving signal based on a control signal from the controller 5, and applies the driving signal to each of the plurality of individual electrodes 12D. With this, the potential of each of the plurality of individual electrodes 12D is changed between a predetermined driving potential and the ground potential. In this situation, a part of the vibration plate 12A and a part of each of the plurality of piezoelectric bodies 12C which are sandwiched between one of the plurality of individual electrodes 12D and one of the pressure chambers 22 (an actuator 12X) is deformed so as to project toward one of the pressure chambers 22. Due to this deformation, the volume of the pressure chamber 22 is changed, which in turn applies the pressure to the ink inside the pressure chamber 22, thereby causing the ink to be ejected from a nozzle 21 included in the plurality of nozzles 21 and corresponding to the pressure chamber 22. The actuator member 12 has a plurality of actuators 12X each of which corresponds to one of the plurality of pressure chambers 22. The actuators 12X are arranged along the first direction so as to correspond, respectively, to the nozzles 21, as depicted in FIGS. 3 and 4.

As described above, according to the head 1 of the present disclosure, for example in the two adjacent channel groups 41 and 42 which are adjacent in the third direction, the set of the supply port 31X and the discharge port 32X communicating with the channel group 41 is arranged at the side of the one end part in the first direction (on the side of the upper end part in FIG. 2) of the channel member 11, and the set of the supply port 31X and the discharge port 32X communicating with the channel group 42 is arranged at the side of the other end part in the first direction (on the side of the lower end part in FIG. 2) of the channel member 11. Owing to this, the tendencies in the increase in the temperature by the heat transferred from the actuator member 12 (actuator 12X) and in the difference in the flow amount in the first direction become opposite between the two adjacent channel groups.

Namely, in the channel groups 41, 43 and 45, since the sets of the supply port 31X and the discharge port 32X are on the side of the one end part in the first direction of the channel member 11, the side of the one end part of the channel member 11 is cooled further than the side of the other end part of the channel member 11, due to the difference in the flow amount during the printing. On the other hand, in the channel groups 42, 44 and 46, since the sets of the supply port 31X and the discharge port 32X are on the side of the other end part in the first direction of the channel member 11, the side of the other end part of the channel member 11 is cooled further than the side of the one end part of the channel member 11, due to the difference in the flow amount during the printing. Further, in the channel groups 41, 43 and 45, since the sets of the supply port 31X and the discharge port 32X are on the side of the one end part in the first direction of the channel member 11, the temperature in the side of the other end part of the channel member 11 is increased more easily than the temperature in the side of the one end part of the channel member 11, due to the heat transferred from the actuator member 12 (actuators 12X) during the printing. On the other hand, in the channel groups 42, 44 and 46, since the sets of the supply port 31X and the discharge port 32X are on the side of the other end part in the first direction of the channel member 11, the temperature in the side of the one end part of the channel member 11 is increased more easily than the temperature in the side of the other end part of the channel member 11, due to the heat transferred from the actuator member 12 (actuators 12X) during the printing. In such a manner, the tendency in the increase in the temperature and the tendency in the cooling effect become opposite between the two adjacent channel groups, thereby making it possible to make the difference in temperature of the ink in the first direction small in the entirety of the channel member 11.

Further, the sets of the supply port 31X and the discharge port 32X each communicating with one of the channel groups 41 to 46 are arranged alternately along the third direction at both ends parts in the first direction of the channel member 11. Owing to this, also in the channel member 11 provided with three or more channel groups, it is possible to make the difference in temperature of the ink in the first direction small.

Furthermore, each of the individual channels 20 communicates with the return channel 32. With this, the ink flows between the supply channel 31 and the return channel 32 easily as compared with a case that each of the individual channels 20 does not communicate with the return channel 32. Owing to this, the difference in flow amount in the first direction between the supply channel 31 and the return channel 32 becomes small, which in turn makes the difference in temperature in the first direction small as well. Moreover, in this configuration, it is possible to discharge an air bubble in each of the individual channels 20, via the return channel 32. Further, by circulating the ink in the supply channel 31, the individual channels 20 and the return channel 32, it is possible to suppress any increase in the viscosity of the ink in the individual channels 20.

In each of the channel groups 41 to 46, the supply port 31X and the discharge port 32X are arranged side by side in the third direction. With this, it is possible to make the size of the channel member 11 small in the first direction.

The supply port 31X of each of the channel groups 41, 43 and 45 (or 42, 44 and 46) and the discharge port 32X of each of the channel groups 42, 44 and 46 (or 41, 43 and 45) are arranged along the first direction. With this, it is possible to make the size of the channel member 11 small in the third direction.

Second Embodiment

Figure 5:
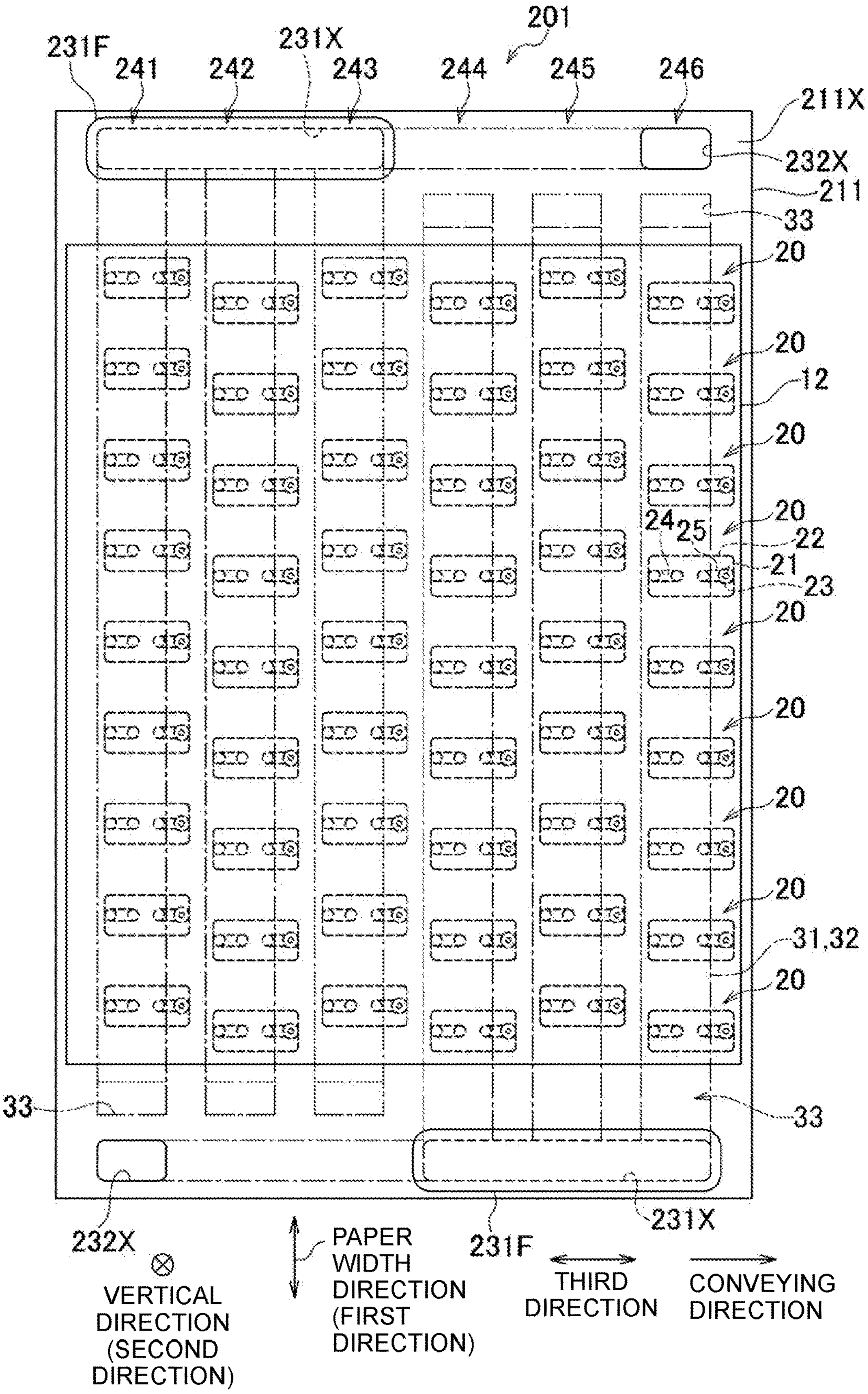
FIG. 5 is a plan view depicting a head according to an embodiment of the present disclosure.

Next, a head 201 according to a second embodiment of the present disclosure will be explained, with reference to FIG. 5. A configuration of the second embodiment which is similar to that of the first embodiment is designated by the same reference numeral, and any explanation therefor will be omitted. Two supply ports 231X and two discharge ports 232X are provided on an upper surface 211X of a channel member 211 of the head 201 according to the second embodiment. The upper surface 211X has a rectangular shape which is long in the first direction. A set of the supply port 231X and the discharge port 232X is provided on a side of one end part in the first direction (side of an upper end part in FIG. 5) of the channel member 211, and another set of the supply port 231X and the discharge port 232X is provided on a side of the other end part in the first direction (side of a lower end part in FIG. 5) of the channel member 211.

The supply port 231X on the side of the one end part in the first direction of the channel member 211 communicates with the supply channel 31 of each of three channel groups 241 to 243 which are arranged on the left side among six channel groups 241 to 246. The supply port 231X on the side of the other end part in the first direction of the channel member 211 communicates with the supply channel 31 of each of three channel groups 244 to 246 which are arranged on the right side among the six channel groups 241 to 246. Each of these two supply ports 231X has a substantially rectangular planar shape which is long in the third direction, and has an area greater than an area of each of the two discharge ports 232X.

Two filters 231F are provided on the upper surface 211X of the channel member 211. Each of the filters 231F covers the entirety of one of the supply ports 231X. With this, it is possible to catch a foreign mater from the ink flowing into each of the supply cannels 31.

The discharge port 232X on the side of the one end part in the first direction of the channel member 211 communicates with the return channel 32 of each of the three channel groups 241 to 243 on the left side. The discharge port 232X on the side of the other end part in the first direction of the channel member 211 communicates with the return channel 32 of each of the three channel groups 244 to 246 on the right side. Further, each of the two discharge ports 232X are arranged at a corner part of the upper surface 211X of the channel member 211. Note that the three channel groups 241 to 243 on the left side have mutually same configurations. The three channel groups 244 to 246 on the right side also have mutually same configurations. The three channel groups 241 to 243 on the left side and the three channel groups 244 to 246 on the right side are arranged in opposite to one another in the first direction. The configuration of each of the individual channels 20, the supply channel 31 and the return channel 32 in each of the channel groups 241 to 246 are same as those in the first embodiment.

In the second embodiment, a set of the supply port 231X and the discharge port 232X communicating with each of the three channel groups 241 to 243 on the left side and a set of the supply port 231X and the discharge port 232X communicating with each of the three channel groups 244 to 246 on the right side are arranged to be opposite to each other in the first direction.

As described above, also in the head 201 of the second embodiment, in the two adjacent channel groups 243 and 244 which are adjacent to each other, the set of the supply port 231X and the discharge port 232X communicating with the channel group 243 is arranged on the side of the one end part in the first direction of the channel member 211, and the set of the supply port 231X and the discharge port 232X communicating with the channel group 244 is arranged on the side of the other end part in the first direction of the channel member 211. Owing to this, it is possible to obtain an effect similar to the effect obtained in the first embodiment. Note that in a configuration in the second embodiment which is similar to the configuration in the first embodiment, it is possible to obtain a similar effect to the effect obtained in the first embodiment.

The area of each of the supply ports 231X is greater than the area of each of the discharge ports 232X. With this, it is possible to make the area of each of the filters 231F larger. With this, the filters 231F are less likely to be closed or clogged by a foreign matter caught thereby.

One supply port 231X communicates with three supply channels 31 belonging, respectively, to the three channel groups 241 to 243 (or 244 to 246). With this, it is possible to further make the area of the supply port 231X greater, and thus to make the area of the filter 231F greater.

Each of the discharge ports 232X is arranged at the corner part of the upper surface 211X. By arranging each of the discharge ports 232X at the corner part, it is possible to arrange each of the supply port 231X at a space which is different from the corner part and which is large. With this, it is possible to make the area of each of the supply ports 231X great, and to make the area of each of the filters 231F great, as well.

Third Embodiment

Figure 6:
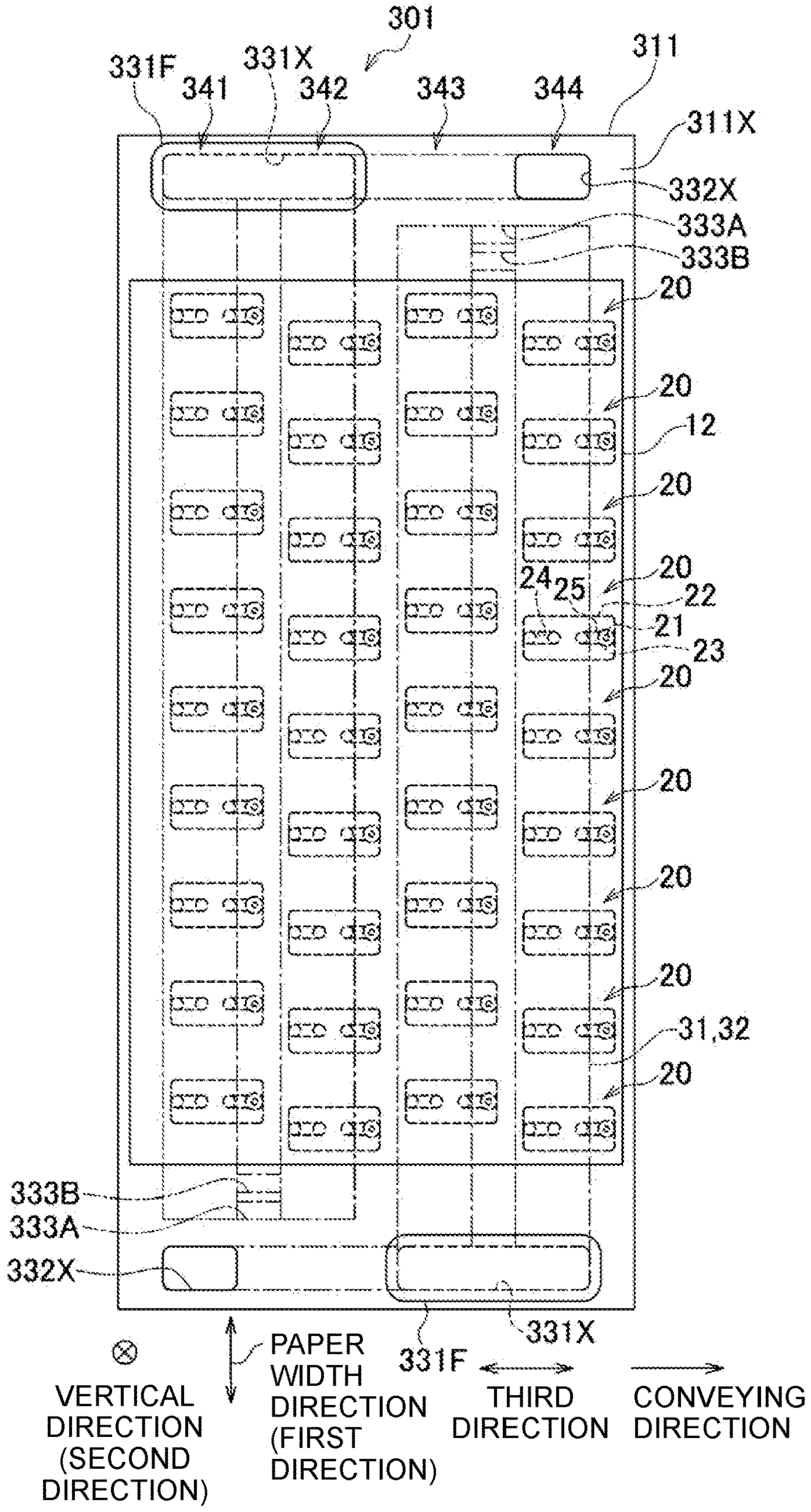
FIG. 6 is a plan view depicting a head according to an embodiment of the present disclosure.

Next, a head 301 according to a third embodiment of the present disclosure will be explained, with reference to FIG. 6. A configuration of the third embodiment which is similar to that of the first and second embodiments is designated by the same reference numeral, and any explanation therefor will be omitted.

In the second embodiment, the six channel groups 241 to 246 are provided. In the third embodiment (FIG. 6), however, four channel groups 341 to 344 are provided. In the second embodiment, the connecting channel 33 belonging to each of the channel groups 241 to 246 connects the supply channel 31 and the return channel 32 which are arranged side by side in the second direction. In the third embodiment, a connecting channel 333A connects a supply channel 31 of the channel group 341 (one of two adjacent channel groups 341 and 342 which are adjacent in the third direction) and a return channel 32 of the channel group 342 (the other of the two adjacent channel groups 341 and 342), and a connecting channel 333B connects a return channel 32 of the channel group 341 and a supply channel 31 of the channel group 342. Further, a connecting channel 333A connects a supply channel 31 of the channel group 343 (one of two adjacent channel groups 343 and 344 which are adjacent in the third direction) and a return channel 32 of the channel group 344 (the other of the two adjacent channel groups 343 and 344), and a connecting channel 333B connects a return channel 32 of the channel group 343 and a supply channel 31 of the channel group 344. Note that the arrangement and configuration of each of the individual channels 20, the supply channel 31 and the return channel 32 in each of the channel groups 341 to 344 are similar to those in the first embodiment.

Two supply ports 331X and two discharge ports 232X are provided on an upper surface 311X of a channel member 311 of the head 301 according to the third embodiment. A set of the supply port 331X and the discharge port 332X is provided on a side of one end part in the first direction (side of an upper end part in FIG. 6) of the channel member 311, and another set of the supply port 331X and the discharge port 332X is provided on a side of the other end part in the first direction (side of a lower end part in FIG. 6) of the channel member 311.

The supply port 331X on the side of the one end part in the first direction of the channel member 311 communicates with the supply channel 31 of each of two channel groups 341 and 342 which are arranged on the left side. The supply port 331X on the side of the other end part in the first direction of the channel member 311 communicates with the supply channel 31 of each of two channel groups 343 and 344 which are arranged on the right side. Each of the two supply ports 331X has a substantially rectangular planar shape which is long in the third direction, and has an area greater than an area of each of the two discharge ports 332X.

Two filters 331F are provided on the upper surface 311X of the channel member 311. Each of the filters 331F covers the entirety of one of the supply ports 331X. With this, it is possible to catch a foreign mater from the ink flowing into each of the supply cannels 31.

The discharge port 332X on the side of the one end part in the first direction of the channel member 311 communicates with the return channel 32 of each of the two channel groups 341 and 342 on the left side. The discharge port 332X on the side of the other end part in the first direction of the channel member 311 communicates with the return channel 32 of each of the two channel groups 343 and 344 on the right side. Further, each of the two discharge ports 332X is arranged at a corner part of the upper surface 311X of the channel member 311.

In the third embodiment, a set of the supply port 331X and the discharge port 332X communicating with each of the two channel groups 341 and 342 on the left side and a set of the supply port 331X and the discharge port 332X communicating with each of the two channel groups 343 and 344 on the right side are arranged to be opposite to each other in the first direction.

As described above, also in the head 301 of the third embodiment, in the two adjacent channel groups 342 and 343 which are adjacent to each other, the set of the supply port 331X and the discharge port 332X communicating with the channel group 342 (one of the two adjacent channel groups 342 and 343) is arranged on the side of the one end part in the first direction of the channel member 311, and the set of the supply port 331X and the discharge port 332X communicating with the channel group 343 (the other of the two adjacent channel groups 342 and 343) is arranged on the side of the other end part in the first direction of the channel member 311. Owing to this, it is possible to obtain an effect similar to the effect obtained in the first embodiment. Note that in a configuration in the third embodiment which is similar to the configuration in the first and second embodiments, it is possible to obtain a similar effect to the effect obtained in the first and second embodiments.

Fourth Embodiment

Next, a head 401 according to a fourth embodiment of the present disclosure will be explained, with reference to FIG.

7. A configuration of the fourth embodiment which is similar to that of the first to third embodiments is designated by the same reference numeral, and any explanation therefor will be omitted.

In the fourth embodiment, two channel groups 441 and 442 are provided. The supply channel 31 and the return channel 32 belonging to each of the channel groups 41 to 46 as descried above are arranged side by side in the second direction in each of the above-described first to third embodiments. In the fourth embodiment, a supply channel 31 and a return channel 32 are arranged side by side in the third direction. The supply channel 31 and the return channel 32 arranged side by side in the third direction are connected by a connecting channel 433. Each of the two channel groups 441 and 442 has two individual channel rows arranged side by side in the third direction. Each of the two individual channel rows is constructed by a plurality of individual channels 20 aligned in the first direction. Each of the plurality of individual channels 20 in the fourth embodiment is not provided with the outflow channel 25. Individual channels 20 belonging to one individual channel row communicate with the supply channel 31, and individual channels 20 belonging to the other individual channel row communicate with the return channel 32.

Figure 7:
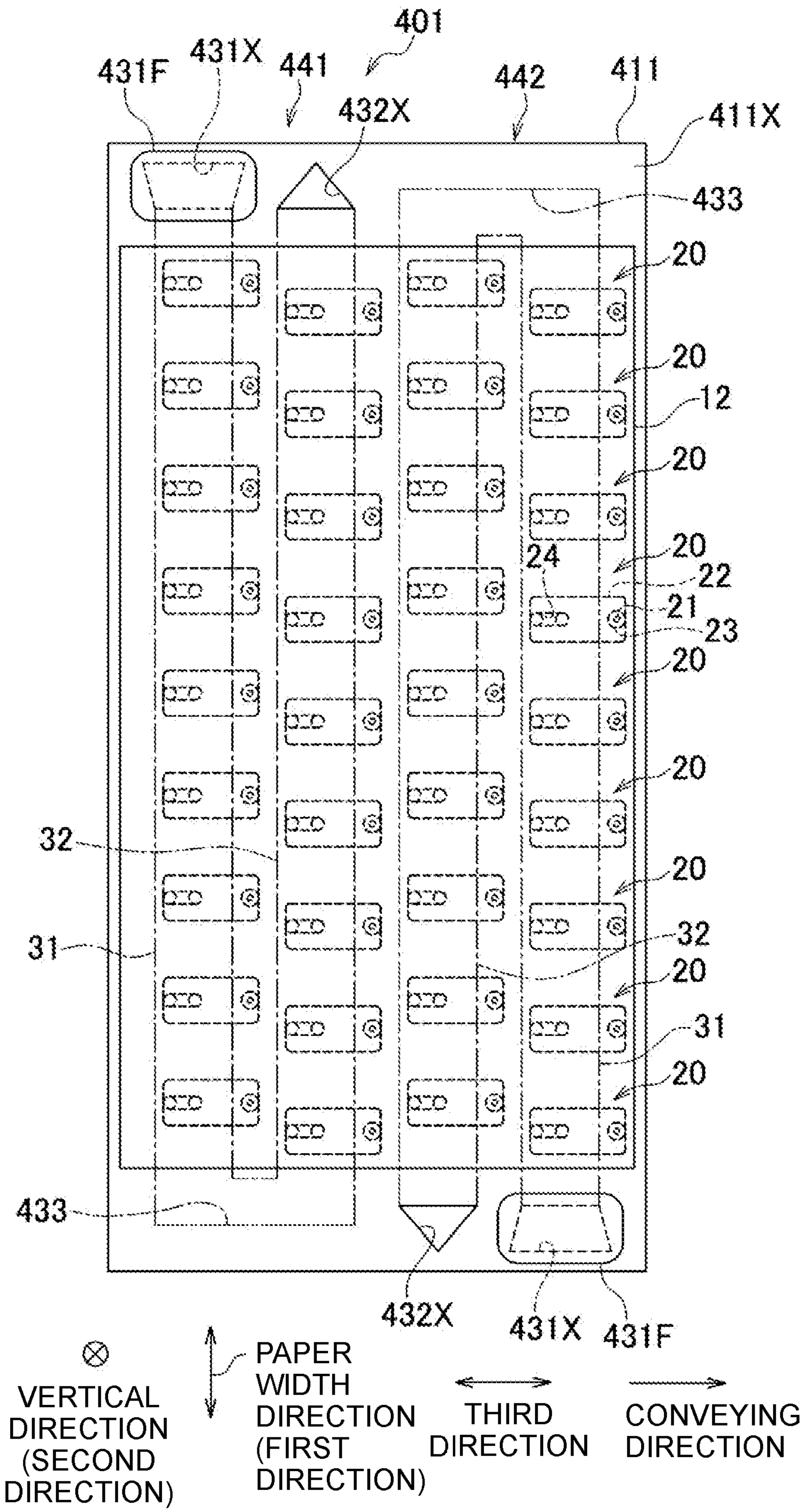
FIG. 7 is a plan view depicting a head according to an embodiment of the present disclosure.

Two supply ports 431X and two discharge ports 432X are provided on an upper surface 411X of a channel member 411 of the head 401 according to the fourth embodiment. A set of the supply port 431X and the discharge port 432X is provided on a side of one end part in the first direction (side of an upper end part in FIG. 7) of the channel member 411, and another set of the supply port 431X and the discharge port 432X is provided on a side of the other end part in the first direction (side of a lower end part in FIG. 7) of the channel member 411.

The supply port 431X and the discharge port 432X on the side of the one end part in the first direction of the channel member 411 communicate, respectively, with the supply channel 31 and the return channel 32 of the channel group 441, and are arranged side by side in the third direction. The supply port 431X and the discharge port 432X on the side of the other end part in the first direction of the channel member 411 communicate, respectively, with the supply channel 31 and the return channel 32 of the channel group 442, and are arranged side by side in the third direction.

The supply port 431X is formed to have a trapezoidal planar shape so that the width in the third direction thereof becomes smaller, in a case that the supply port 431X is seen from the upper side in the vertical direction (a direction facing the upper surface 411Z), as approaching closer toward the supply channel 31 along the first direction. The discharge port 432X is formed to have a substantially triangular planar shape so that the width in the third direction thereof becomes smaller, in a case that the discharge port 432X is seen from the vertical direction, as separating farther from the return channel 32 along the first direction. Owing to this, it is possible to make the area of the supply port 431X great in a state that the supply port 431X and the discharge port 432X are arranged side by side in the third direction. Further, each of a flow of the ink from the supply port 431X to the supply channel 31 and a flow of the ink from the return channel 32 to the discharge port 432X becomes smooth, thereby suppressing the generation of air bubble.

Two filters 431F are provided on the upper surface 411X of the channel member 411. Each of the filters 431F covers the entirety of one of the supply ports 431X. With this, it is possible to catch a foreign mater from the ink flowing into each of the supply cannels 31.

In the fourth embodiment, a set of the supply port 431X and the discharge port 432X communicating with the channel group 441 and a set of the supply port 431X and the discharge port 432X communicating with the channel group 442 are arranged to be opposite to each other in the first direction.

As described above, also in the head 401 of the fourth embodiment, in the two adjacent channel groups 441 and 442 which are adjacent to each other, the set of the supply port 431X and the discharge port 432X communicating with the channel group 441 is arranged on the side of the one end part in the first direction of the channel member 411, and the set of the supply port 431X and the discharge port 432X communicating with the channel group 442 is arranged on the side of the other end part in the first direction of the channel member 411. Owing to this, it is possible to obtain an effect similar to the effect obtained in the first embodiment. Note that in a configuration in the fourth embodiment which is similar to the configuration in the first to third embodiments, it is possible to obtain a similar effect to the effect obtained in the first to third embodiments.

Since the supply port 431X and the discharge port 432X have, respectively, the shapes as described above, it is possible to make the area of the supply port 431X great in a state that the supply port 431X and the discharge port 432X are arranged side by side in the third direction. Further, each of a flow of the ink from the supply port 431X to the supply channel 31 and a flow of the ink from the return channel 32 to the discharge port 432X becomes smooth. Provided that the supply port has a rectangular planar shape, and that the width in the third direction of the supply port is greater than the width of the supply channel 31, there is such a case that an ink at a corner part, on the side of the supply channel 31, of the supply port might not flow smoothly into the supply channel 31 and might stagnate, in some cases. An air bubble is likely to be generated in a part wherein the ink stagnates in such a manner. However, in the fourth embodiment, the ink flows smoothly, thereby suppressing the generation of air bubble.

Fifth Embodiment

Figure 8:
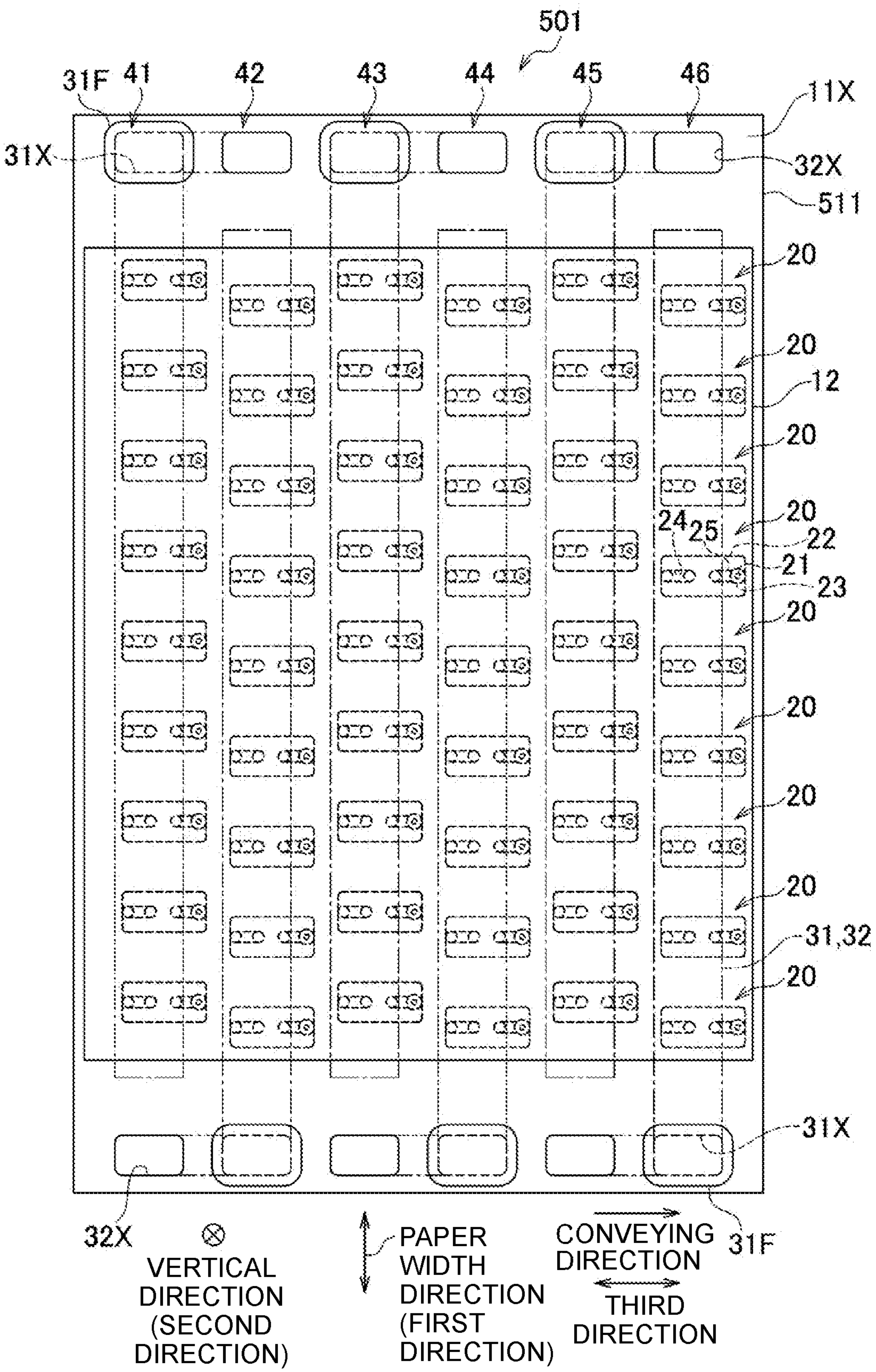
FIG. 8 is a plan view depicting a head according to an embodiment of the present disclosure.

Next, a head 501 according to a fifth embodiment of the present disclosure will be explained, with reference to FIG. 8. A configuration of the fifth embodiment which is similar to that of the first embodiment is designated by the same reference numeral, and any explanation therefor will be omitted.

The head 501 according to the fifth embodiment is similar to the head 1 of the first embodiment, except that the connecting channel 33 belonging to each of channel groups 41 to 46 is not formed in a channel member 511. The remaining configuration different from the above-described configuration of the head 501 of the fifth embodiment is same as that of the head 1 of the first embodiment. Also in the head 501 of the fifth embodiment, for example in two adjacent channel groups 41 and 42 which are adjacent in the third direction, a set of the supply port 31X and the discharge port 32X communicating with the channel group 41 is arranged at the side of one end part in the first direction (on the side of an upper end part in FIG. 8) of the channel member 511, and a set of the supply port 31X and the discharge port 32X communicating with the channel group 42 is arranged at the side of the other end part in the first direction (on the side of a lower end part in FIG. 8) of the channel member 511. Owing to this, the tendencies in the increase in the temperature by the heat transferred from the actuator member 12 (actuator 12X) and in the difference in the flow amount in the first direction become opposite between the two adjacent channel groups. Owing to this, it is possible to obtain an effect similar to the effect obtained in the first embodiment. Note that in a configuration in the fifth embodiment which is similar to the configuration in the first embodiment, it is possible to obtain a similar effect to the effect obtained in the first embodiment.

In the foregoing, although the embodiments of the present disclosure have been explained, the present disclosure is not limited to or restricted by the above-described embodiments; a variety of kinds of changes is possible, within the scope of the claims.

In the above-described first embodiment, although the supply port 31X and the discharge port 32X are arranged side by side in the third direction in each of the channel groups 41 to 46, it is allowable that the supply port 31X and the discharge port 32X are arranged side by side in the first direction. Further, it is allowable that the supply port 31X and the discharge port 32X are formed in a side surface crossing the upper surface 11X of the channel member (a side surface on one side in the first direction and a side surface on the other side in the first direction of the channel member 11). Furthermore, it is allowable that the individual channel 20 does not have the outflow port 25.

It is allowable that each of the discharge ports 232X and 332X of the second and third embodiments is arranged at a part, of the upper surfaces 211X and 311X, which is different from the corner part (a part or location closer to the center in the third direction).

It is allowable that the filters 31F, 231F, 331F and 431F are not provided. Further, it is allowable that a filter covering each of the discharge ports 32X, 232X, 332X and 432X is provided.

The liquid ejecting head is not limited to a head of the line system, and may be a head of a serial system (a system in which a head ejects liquid from a nozzle toward an object of ejection while head is being moved in a scanning direction parallel to the paper width direction).

The object of ejection is not limited to being the paper sheet (sheet, paper), and may be, for example, cloth (fabric), a substrate, etc.

The liquid ejected from the nozzles is not limited to being the ink, and may be any liquid (e.g., a treatment liquid which agglutinates or precipitates a constituent or component of ink, etc.).

The present disclosure is applicable also to facsimiles, copy machines, multifunction peripherals, etc., without being limited to printers. Further, the present disclosure is applicable also to a liquid ejecting head used for any other application than the image recording (for example, a liquid ejecting head which forms an electroconductive pattern by ejecting electroconductive liquid onto a substrate).

What is claimed is:

1. A liquid ejecting head, comprising:

a channel member having a plurality of channel groups; and a plurality of actuators arranged on the channel member, wherein each of the channel groups has:

a plurality of nozzles aligned along a first direction;

a supply channel extending in the first direction and communicating with the nozzles;

a return channel extending in the first direction, communicating with the nozzles, and arranged side by side with the supply channel in a second direction crossing the first direction; and a connecting channel connecting one end in the first direction of the supply channel and one end in the first direction of the return channel, the channel groups are aligned in a third direction crossing the first direction, each of the actuators is configured to apply energy to liquid in the channel member to cause the liquid to be ejected from one of the nozzles, the actuators being arranged along the first direction to correspond to the nozzles, the channel member further has a supply port communicating with the other end in the first direction of the supply channel, and a discharge port communicating with the other end in the first direction of the return channel, and in two channel groups, which are included in the channel groups and which are adjacent in the third direction, a set of the supply port and the discharge port communicating with one of the two channel groups and a set of the supply port and the discharge port communicating with the other of the two channel groups are arranged to be opposite to each other in the first direction.

2. The liquid ejecting head according to claim 1, wherein each of the channel groups has a plurality of individual channels, and each of the individual channels has a nozzle included in the nozzles, a first communicating channel having one end communicating with the supply channel and the other end communicating with the nozzle, and a second communicating channel having one end communicating with the nozzle and the other end communicating with the return channel.

3. A liquid ejecting head, comprising:

a channel member having a plurality of channel groups; and a plurality of actuators arranged on the channel member, wherein each of the channel groups has:

a plurality of individual channels aligned along a first direction;

a supply channel extending in the first direction and communicating with the individual channels; and a return channel extending in the first direction, communicating with the individual channels, and arranged side by side with the supply channel in a second direction crossing the first direction, the channel groups are aligned in a third direction crossing the first direction, the individual channels have nozzles, first communicating channels having one ends communicating with the supply channel and the other ends communicating with the nozzles, and second communicating channels having one ends communicating with the nozzles and the other ends communicating with the return channel, each of the actuators is configured to apply energy to liquid in the channel member to cause the liquid to be ejected from one of the nozzles, the actuators being arranged along the first direction to correspond to the nozzles, the channel member further has a supply port communicating with one end in the first direction of the supply channel, and a discharge port communicating with one end in the first direction of the return channel, and in two channel groups, which are included in the channel groups and which are adjacent in the third direction, a set of the supply port and the discharge port communicating with one of the two channel groups and a set of the supply port and the discharge port communicating with the other of the two channel groups are arranged to be opposite to each other in the first direction.

4. The liquid ejecting head according to claim 3, wherein each of the channel groups further has a connecting channel connecting the other end in the first direction of the supply channel and the other end in the first direction of the return channel.

5. The liquid ejecting head according to claim 1, wherein
the supply port and the discharge port are formed on a surface of the channel member, and
the supply port and the discharge port are arranged side by side in the third direction in each of the channel groups.

6. The liquid ejecting head according to claim 3, wherein
the supply port and the discharge port are formed on a surface of the channel member; and
the supply port and the discharge port are arranged side by side in the third direction in each of the channel groups.

7. The liquid ejecting head according to claim 5, wherein the supply port of the one of the two channel groups and the discharge port of the other of the two channel groups are arranged along the first direction.

8. The liquid ejecting head according to claim 6, wherein the supply port of the one of the two channel groups and the discharge port of the other of the two channel groups are arranged along the first direction.

9. The liquid ejecting head according to claim 1, further comprising a filter configured to cover the supply port.

10. The liquid ejecting head according to claim 3, further comprising a filter configured to cover the supply port.

11. The liquid ejecting head according to claim 9, wherein the discharge port is not covered by the filter.

12. The liquid ejecting head according to claim 10, wherein the discharge port is not covered by the filter.

13. The liquid ejecting head according to claim 9, wherein an area of the supply port is greater than an area of the discharge port.

14. The liquid ejecting head according to claim 10, wherein an area of the supply port is greater than an area of the discharge port.

15. The liquid ejecting head according to claim 5, wherein
as viewed in a direction facing the surface, a width in the third direction of the supply port becomes smaller as approaching toward the supply channel along the first direction, and
as viewed in the direction facing the surface, a width in the third direction of the discharge port becomes smaller as separating from the return channel along the first direction.

16. The liquid ejecting head according to claim 6, wherein
as viewed in a direction facing the surface, a width in the third direction of the supply port becomes smaller as approaching toward the supply channel along the first direction, and
as viewed in the direction facing the surface, a width in the third direction of the discharge port becomes smaller as separating from the return channel along the first direction.

17. The liquid ejecting head according to claim 9, wherein the supply port communicates with the supply channel included in each of the channel groups.

18. The liquid ejecting head according to claim 10, wherein the supply port communicates with the supply channel included in each of the channel groups.

19. The liquid ejecting head according to claim 17, wherein
the supply port and the discharge port are formed in a surface of the channel member,
the surface has a rectangular shape which is long in the first direction, and
the discharge port is arranged at least one corner part of four corner parts in the surface.

20. The liquid ejecting head according to claim 18, wherein
the supply port and the discharge port are formed in a surface of the channel member,
the surface has a rectangular shape which is long in the first direction, and
the discharge port is arranged at least one corner part of four corner parts in the surface.

21. The liquid ejecting head according to claim 1, wherein
the channel groups are provided as three or more channel groups on the channel member, and
sets of the supply port and the discharge port are arranged alternately along the third direction at both ends in the first direction of the channel member, each of the sets communicating with one of the three or more channel groups.

22. The liquid ejecting head according to claim 3, wherein
the channel groups are provided as three or more channel groups on the channel member, and
sets of the supply port and the discharge port are arranged alternately along the third direction at both ends in the first direction of the channel member, each of the sets communicating with one of the three or more channel groups.

* * * * *